United States Patent
Lou et al.

(10) Patent No.: US 9,418,689 B2
(45) Date of Patent: Aug. 16, 2016

(54) DATA STORAGE DEVICE GENERATING AN OPERATING SEEK TIME PROFILE AS A FUNCTION OF A BASE SEEK TIME PROFILE

(71) Applicant: Western Digital Technologies, Inc., Irvine, CA (US)

(72) Inventors: Mingji Lou, Lake Forest, CA (US); Orhan Beker, Dove Canyon, CA (US); Lu Feng, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/706,881

(22) Filed: May 7, 2015

(65) Prior Publication Data
US 2016/0104504 A1    Apr. 14, 2016

Related U.S. Application Data

(63) Continuation-in-part of application No. 14/510,951, filed on Oct. 9, 2014.

(51) Int. Cl.
*G11B 5/596* (2006.01)
*G11B 5/55* (2006.01)

(52) U.S. Cl.
CPC .................................. *G11B 5/5547* (2013.01)

(58) Field of Classification Search
None
See application file for complete search history.

(56) References Cited

U.S. PATENT DOCUMENTS

| | | |
|---|---|---|
| 4,982,298 A | 1/1991 | Volz et al. |
| 5,268,804 A | 12/1993 | Wallis |
| 5,343,131 A | 8/1994 | Baumann |
| 5,381,279 A | 1/1995 | Dunn |
| 5,668,680 A | 9/1997 | Tremaine |
| 5,675,558 A | 10/1997 | Katoh |
| 5,880,902 A | 3/1999 | Yu et al. |
| 6,014,283 A | 1/2000 | Codilian et al. |
| 6,038,096 A | 3/2000 | Zhang et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,115,205 A | 9/2000 | Waugh et al. |
| 6,122,133 A | 9/2000 | Nazarian et al. |
| 6,122,135 A | 9/2000 | Stich |

(Continued)

OTHER PUBLICATIONS

Yang Quan Chen, Kevin L Moore, Jie Yu, Tao Zhang, "Iterative Learning Control and Repetitive Control in Hard Disk Drive Industry—A Tutorial", Proceedings 2006 IEEE Conference on Decision and Control, San Diego, CA, Dec. 2006.

(Continued)

*Primary Examiner* — K. Wong

(57) ABSTRACT

A data storage device is disclosed comprising a head actuated over a disk comprising a plurality of tracks. An operating seek time profile is generated as a function of a base seek time profile, wherein the seek time profiles define a seek time to seek the head radially over the disk by a seek length. A seek operation is executed to seek the head by a target seek length by at least generating a target seek time based on the target seek length and the operating seek time profile, and seeking the head the target seek length based on the target seek time.

14 Claims, 6 Drawing Sheets

(56) References Cited

U.S. PATENT DOCUMENTS

| | | | |
|---|---|---|---|
| 6,140,791 A | 10/2000 | Zhang | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,445,531 B1 | 9/2002 | Gaertner et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,499,022 B1 | 12/2002 | Dittmar et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,563,663 B1 | 5/2003 | Bi et al. | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,608,460 B1 | 8/2003 | Okada | |
| 6,614,615 B1 | 9/2003 | Ju et al. | |
| 6,614,618 B1 | 9/2003 | Sheh et al. | |
| 6,624,964 B1 | 9/2003 | Pirzadeh | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,754,036 B2 | 6/2004 | Dehnert | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,848,019 B1 * | 1/2005 | Mobley | G11B 5/5547 360/78.01 |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,937,431 B2 | 8/2005 | Galloway | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,993,624 B2 | 1/2006 | Hall | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,158,329 B1 | 1/2007 | Ryan | |
| 7,180,703 B1 | 2/2007 | Subrahmanyam et al. | |
| 7,184,230 B1 | 2/2007 | Chue et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al | |
| 7,215,504 B1 | 5/2007 | Bennett | |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |
| 7,265,933 B1 | 9/2007 | Phan et al. | |
| 7,283,321 B1 | 10/2007 | Sun et al. | |
| 7,289,288 B1 | 10/2007 | Tu | |
| 7,298,574 B1 | 11/2007 | Melkote et al. | |

(56) References Cited

U.S. PATENT DOCUMENTS

| | | |
|---|---|---|
| 7,301,717 B1 | 11/2007 | Lee et al. |
| 7,304,819 B1 | 12/2007 | Melkote et al. |
| 7,315,432 B2 | 1/2008 | Lee |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,430,093 B2 | 9/2008 | Lee et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,580,219 B2 | 8/2009 | Derosa et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |

(56) References Cited

U.S. PATENT DOCUMENTS

| | | |
|---|---|---|
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,797,675 B2 | 8/2014 | Birtzer et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,902,539 B1 | 12/2014 | Liu et al. |
| 9,208,815 B1 | 12/2015 | Lou et al. |
| 2003/0189784 A1 | 10/2003 | Galloway |
| 2006/0139792 A1 | 6/2006 | Lee |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Mingxuan Sun, Danwei Wang, "Closed-loop iterative learning control for non-linear systems with initial shifts", International Journal of Adaptive Control Signal Processing, 16(7), 2002, pp. 515-538.

Douglas A. Bristow, Marina Tharayil, Andrew G. Alleyne, "A Survey of Iterative Learning Control a learning-based method for high-performance tracking control", IEEE Control Systems Magazine, Jun. 2006, vol. 26: pp. 96-114.

Notice of Allowance dated Aug. 6, 2015 from U.S. Appl. No. 14/510,951, 6 pages.

Non-Final Office Action dated Mar. 2, 2015 from U.S. Appl. No. 14/510,951, 7 pages.

\* cited by examiner

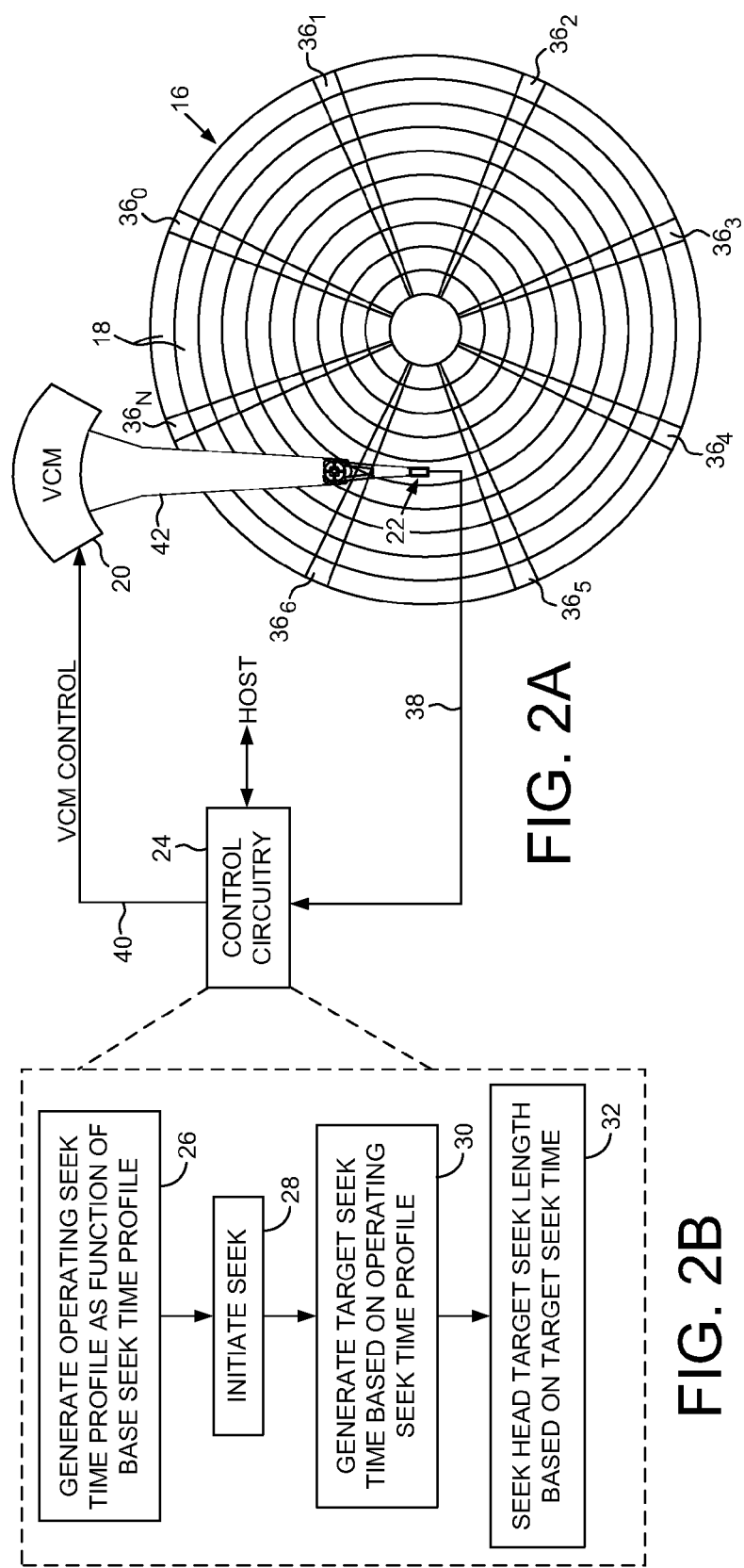

US 9,418,689 B2

DATA STORAGE DEVICE GENERATING AN OPERATING SEEK TIME PROFILE AS A FUNCTION OF A BASE SEEK TIME PROFILE

CROSS REFERENCE TO RELATED APPLICATION(S)

This application is a continuation-in-part of co-pending U.S. patent application Ser. No. 14/510,951 filed on Oct. 9, 2014, entitled "DATA STORAGE DEVICE DYNAMICALLY REDUCING COAST VELOCITY DURING SEEK TO REDUCE POWER CONSUMPTION," to Mingji Lou et al., which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk.

FIG. 2B is a flow diagram according to an embodiment wherein an operating seek time profile is generated based on a base seek time profile.

DETAILED DESCRIPTION

Figure 1:
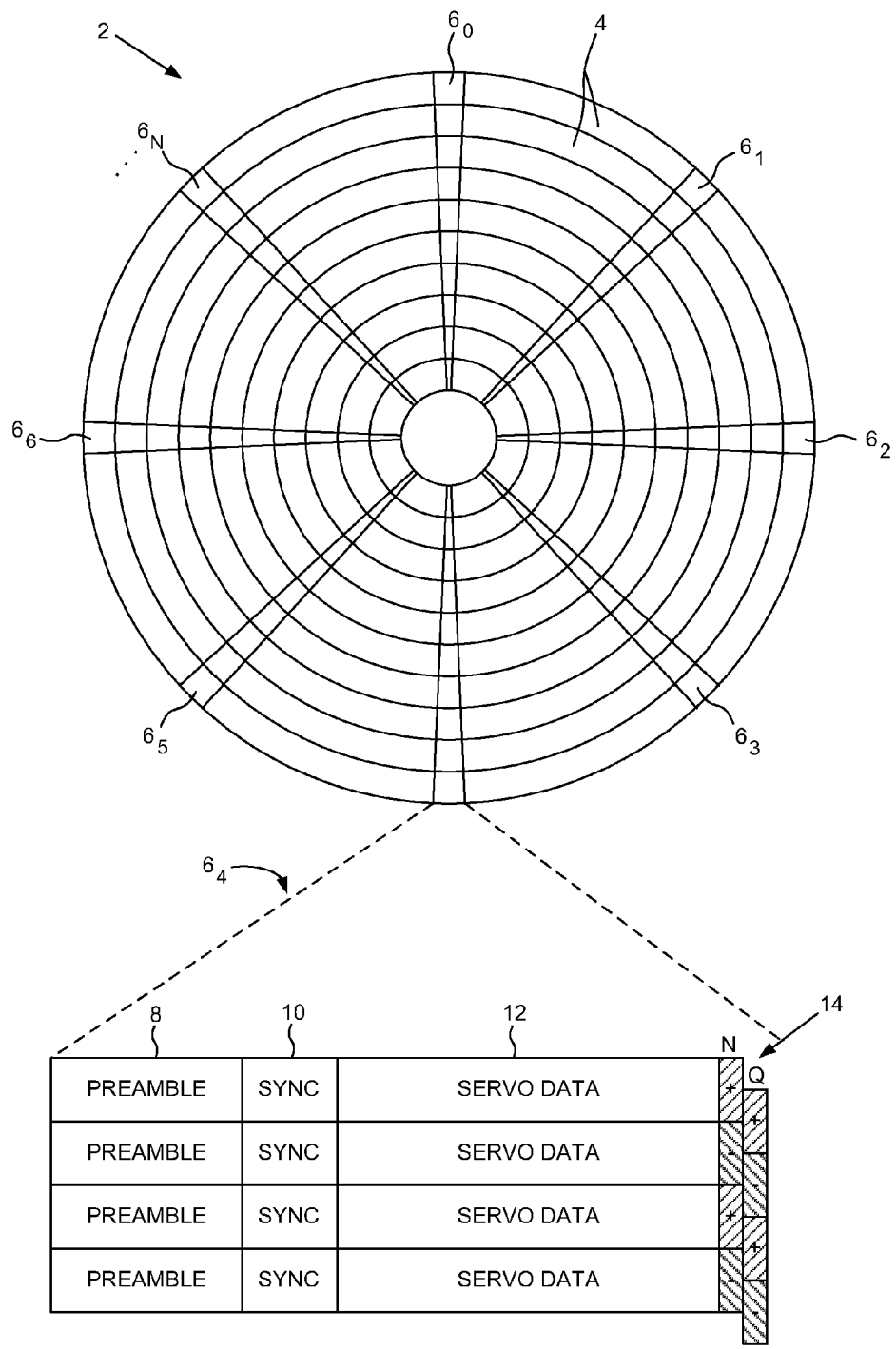
FIG. 1 shows a prior art disk format comprising a plurality of servo tracks defined by servo sectors.

FIG. 2A shows a data storage device in the form of a disk drive according to an embodiment comprising a disk 16 comprising a plurality of tracks 18, and an actuator 20 configured to actuate a head 22 over the disk 16. The disk drive further comprises control circuitry 24 configured to execute the flow diagram of FIG. 2B, wherein an operating seek time profile is generated as a function of a base seek time profile (block 26), wherein the seek time profiles define a seek time to seek the head radially over the disk by a seek length. A seek operation is executed (block 28) to seek the head by a target seek length by at least generating a target seek time based on the target seek length and the operating seek time profile (block 30), and seeking the head the target seek length based on the target seek time (block 32).

In the embodiment of FIG. 2A, the disk 16 comprises a plurality of servo sectors $36_0$-$36_N$ that define a plurality of servo tracks, wherein data tracks 18 are defined relative to the servo tracks at the same or different radial density. The control circuitry 24 processes a read signal 38 emanating from the head 22 to demodulate the servo sectors $36_0$-$36_N$ and generate a position error signal (PES) representing an error between the actual position of the head and a target position relative to a target track. The control circuitry 24 filters the PES using a suitable compensation filter to generate a control signal 40 applied to a voice coil motor (VCM) 20 which rotates an actuator arm 42 about a pivot in order to actuate the head 22 radially over the disk 16 in a direction that reduces the PES. The servo sectors $36_0$-$36_N$ may comprise any suitable head position information, such as a track address for coarse positioning and servo bursts for fine positioning. The servo bursts may comprise any suitable pattern, such as an amplitude based servo pattern or a phase based servo pattern.

Figure 2C:
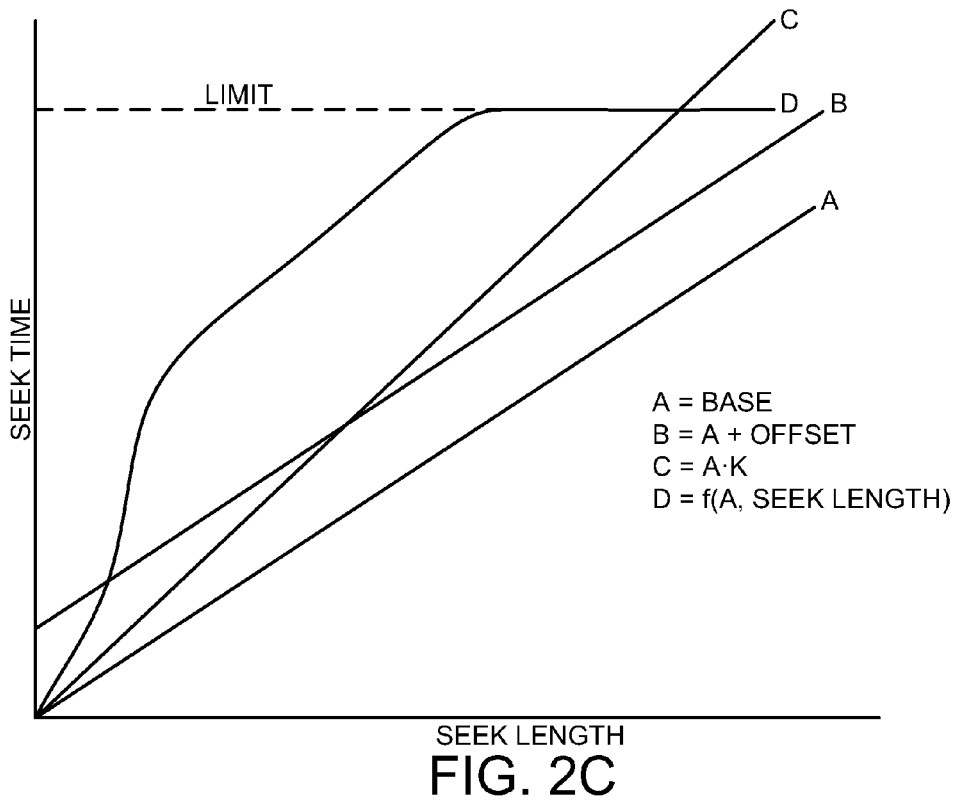
FIG. 2C shows example embodiments of operating seek time profiles generated based on a base seek time profile.

FIG. 2C illustrates examples of different operating seek time profiles (B,C,D) that are generated based on a base seek time profile (A). Each operating seek time profile may correspond to a desired performance of the disk drive; that is, each operating seek time profile may change various performance metrics of the disk drive. For example, in one embodiment, the base seek time profile (A) may correspond to the shortest seek times and therefore increase throughput performance but also increase power consumption and/or acoustic noise. In one embodiment, the performance of the disk drive may be improved in terms of power consumption and/or acoustic noise by executing seek operations using an operating seek time profile generated by adding an offset to the base seek time profile (A) or by scaling the base seek time profile (A) by a scalar. Examples of these embodiments are illustrated in FIG. 2C by operating seek time profile (B) and operating seek time profile (C). Other operating seek time profiles may be generated based on the base seek time profile (A) to meet desired performance criteria, such as an operating seek time profile that achieves a desired average random seek time while limiting the maximum seek time, an example of which as illustrated by the operating seek time profile (D) in FIG. 2C. In one embodiment, the operating seek time profile (D) may be generated as a complex function based on the seek lengths and corresponding seek times in the base seek time profile.

Figure 2D:
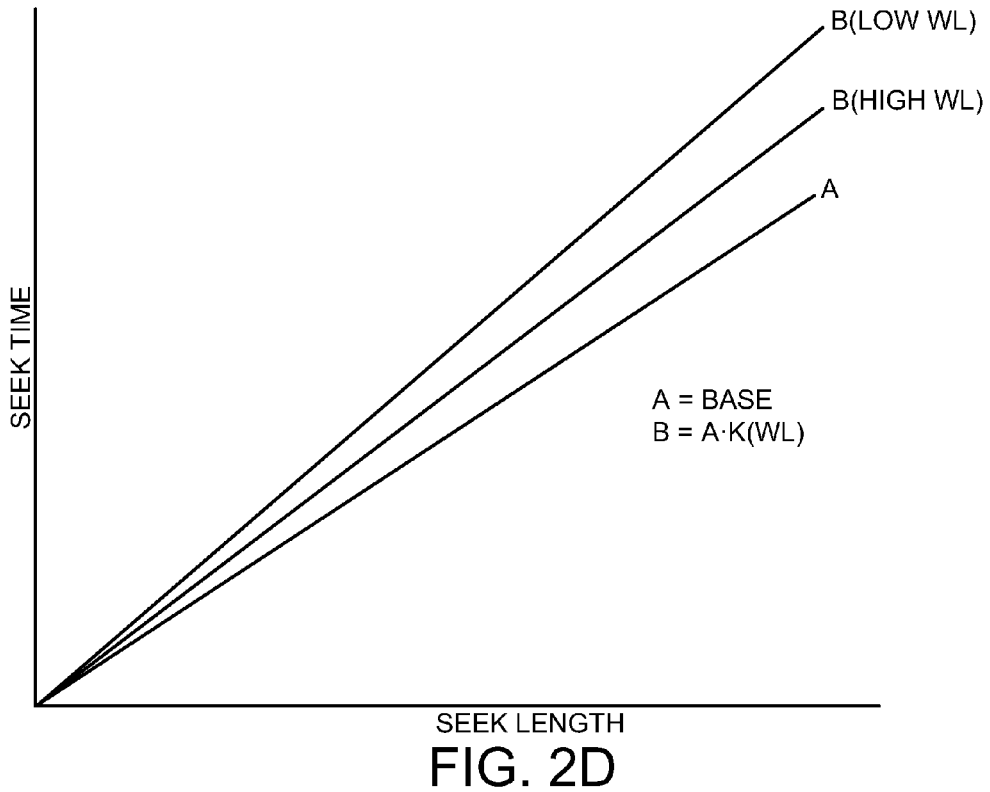
FIG. 2D shows an embodiment wherein the operating seek time profile may be adjusted as a function of a runtime parameter, such as workload.

In one embodiment, the operating seek time profile may be adjusted as a function of a runtime parameter of the disk drive. For example, in one embodiment the operating seek time profile may be adjusted relative to a current workload of the disk drive, which may be measured in any suitable manner, such as based on a number and/or size of access commands queued in a command queue. FIG. 2D illustrates an example of this embodiment wherein the operating seek time profile (B) may be adjusted by adjusting a scalar for scaling the base seek time profile (A) relative to the workload of the disk drive. During periods of higher workloads, the scalar may be decreased so as to decrease the seek times and thereby prevent or reduce the bottleneck of throughput as seen from the host. When the workload decreases, the scalar may be increased to increase the seek times and thereby decrease power consumption and/or acoustic noise.

Figure 3:
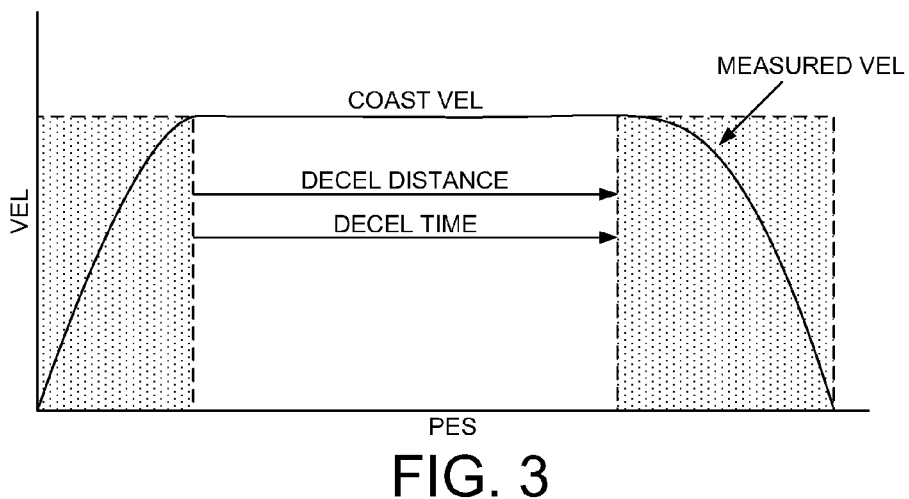
FIG. 3 shows an example seek profile including a coast velocity that is updated during the seek based on the measured velocity, the deceleration distance, and the deceleration time.

In one embodiment, the control circuitry 24 is configured to execute a seek operation based on a seek profile comprising an acceleration phase, a constant velocity phase, and a deceleration phase such as shown in FIG. 3. In prior art disk drives, the seek profile is configured prior to executing the seek, such as by configuring the seek profile based on a seek length and a latency available to perform the seek. However, executing a seek operation based on a preconfigured seek profile may not result in optimal seek performance in terms of power consumption, seek settling, bias learning, etc. Accordingly, in one embodiment the control circuitry 24 is configured to recursively adjust the coast velocity of the seek profile during the seek operation based on a measured velocity of the head during the seek, as well as a corresponding deceleration distance and deceleration time. Also in one embodiment, generating and/or adjusting an operating seek time profile based on a base seek time profile as described above is facilitated by configuring the seek profile on-the-fly during a seek operation based on the seek time derived from the operating seek time profile.

FIG. 3 illustrates an example of this embodiment wherein during the acceleration phase of a seek, the current velocity of the head is measured. A corresponding deceleration distance and deceleration time are generated based on the measured velocity of the head assuming the current measured velocity has converged to a corresponding coast velocity. A target coast velocity is then generated based on the updated deceleration distance and deceleration time. A control signal applied to the actuator is then generated based on a difference between the measured velocity and the target coast velocity. In one embodiment, the control signal increases the velocity of the head toward the target coast velocity. The above process for updating the coast velocity is repeated recursively until the measured velocity converges to the target coast velocity.

Figure 4A:
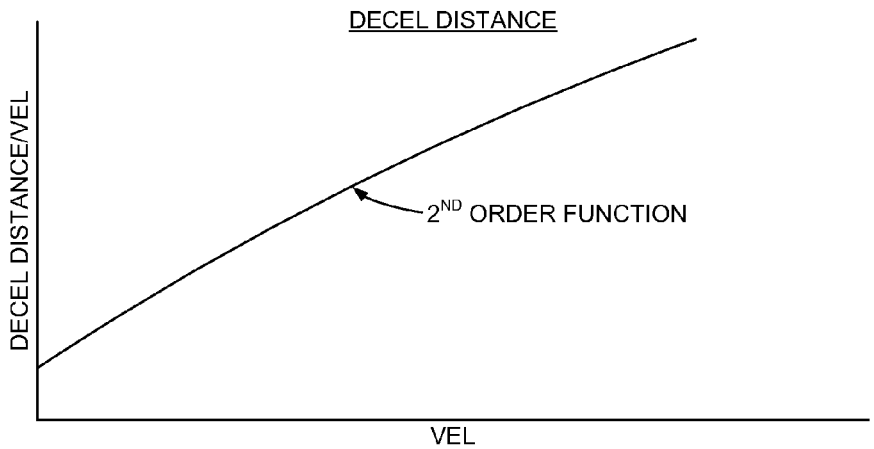
FIG. 4A shows a function representing a deceleration distance relative to a coast velocity according to an embodiment.
Figure 4B:
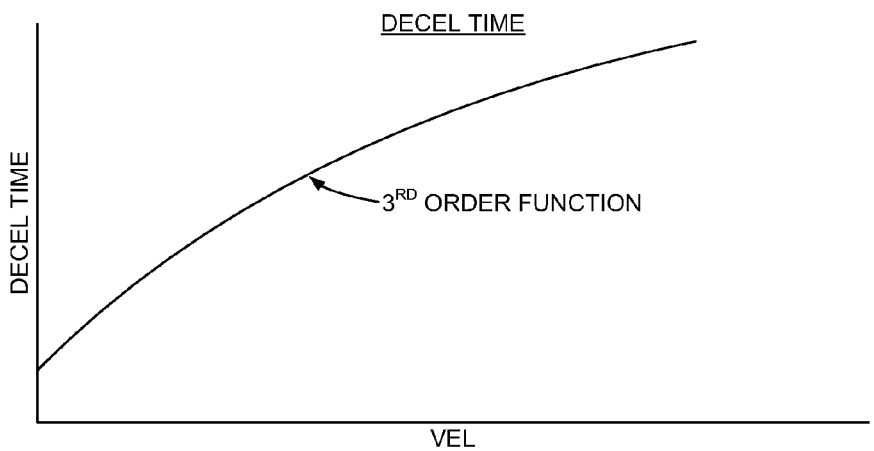
FIG. 4B shows a function representing a deceleration time relative to a coast velocity according to an embodiment.

FIG. 4A shows an example second order phase plane function according to an embodiment representing a relationship between the deceleration distance and the velocity of the head, and FIG. 4B shows a third order phase plane function according to an embodiment representing a relationship between the deceleration time and the velocity of the head. In one embodiment, these phase plane functions are used during the acceleration phase of a seek to generate the deceleration distance and deceleration time parameters that are input into the recursive algorithm for updating the coast velocity as described above with reference to FIG. 3.

Figure 5:
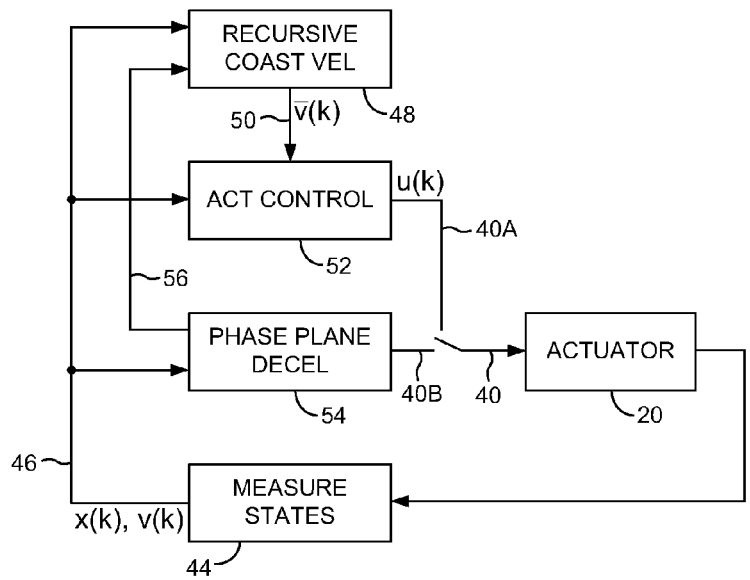
FIG. 5 shows control circuitry according to an embodiment configured to generate an actuator control signal during the seek operation.

FIG. 5 shows control circuitry according to an embodiment comprising a state estimator 44 configured to estimate the states 46 of the servo system, such as the current position and current velocity of the head during a seek operation. During the acceleration phase of the seek profile, block 48 recursively updates the coast velocity 50, and block 52 generates the actuator control signal 40A based on the updated coast velocity 50 and the estimated states 46. When the head reaches the deceleration phase of the seek profile, block 54 generates the actuator control signal 40B based on the estimated states 46 in order to decelerate the head toward the target track. Block 54 also generates the deceleration distance and deceleration time parameters 56 (e.g., based on FIGS. 4A and 4B) that are input into block 48 for updating the coast velocity during the acceleration phase of the seek profile.

Figure 6:
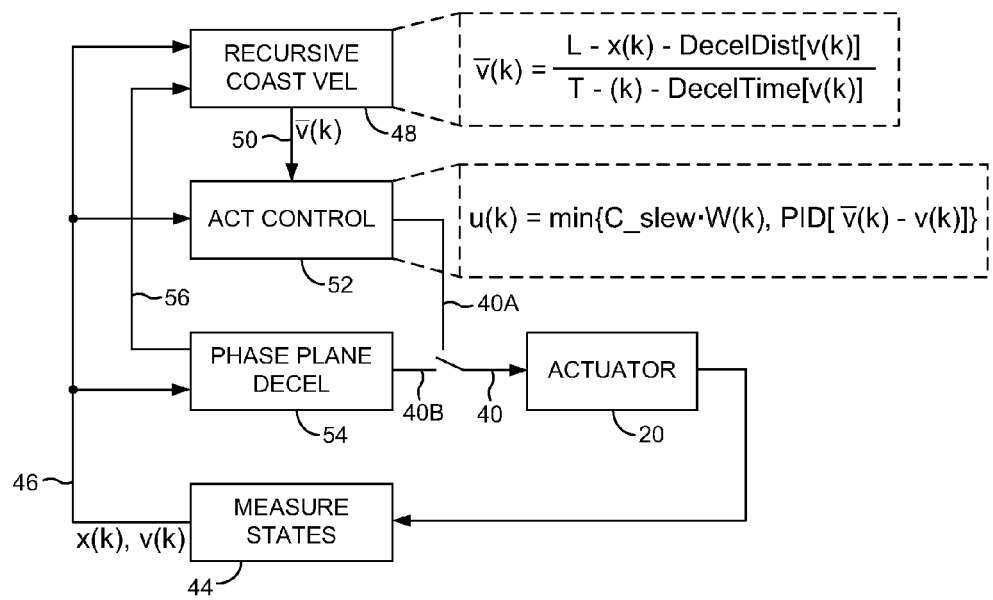
FIG. 6 shows control circuitry configured to generate the actuator control signal during the seek operation, including a specific embodiment for updating the coast velocity.

FIG. 6 shows control circuitry according to an embodiment wherein the coast velocity $\bar{v}(k)$ 50 is updated during the seek based on:

$$\bar{v}(k) = \frac{L - x(k) - DecelDistance[v(k)]}{T - (k) - DecelTime[v(k)]} \quad \text{Eq.(1)}$$

where k represents a current time for the seek, L represents a seek length for the seek, x(k) represents a current position of the head at time k, v(k) represents the measured velocity of the head at time k, DecelDistance[v(k)] represents the deceleration distance for the seek based on the measured velocity, DecelTime[v(k)] represents the deceleration time for the seek based on the measured velocity, and T represents a seek time for the seek which, in one embodiment, is generated based on the operating seek time profile such as shown in FIG. 2C. In other words, in this embodiment the above equation updates the coast velocity $\bar{v}(k)$ 50 by dividing the current coast distance for the seek by the current coast time for the seek.

In the embodiment of FIG. 6, block 52 generates the actuator control signal u(k) 40A based on:

$$u(k) = \min\{C\_slew \cdot W(k), f(\bar{v}(k), v(k))\} \quad \text{Eq.(2)}$$

where W(k) represents a coast time for the seek based on the measured velocity, C_slew is a predetermined scalar, and f represents a suitable function of the updated coast velocity $\bar{v}(k)$ and the measured velocity v(k), such as a proportional-integral-derivative (PID) filter that filters a difference between the coast velocity $\bar{v}(k)$ and the measured velocity v(k) as shown in the example of FIG. 6. The first term in the above Eq.(2) ensures the actuator control signal u(k) 40A decreases to zero prior to reaching the deceleration phase of the seek profile in the event the measured velocity of the head has not yet converge to the target coast velocity. In one embodiment, the coast time is generated based on:

$$W(k) = \frac{sx(k) - v(k)}{sv(k) + a(k)} \quad \text{Eq.(3)}$$

where k represents a current time for the seek, x(k) represents a current position of the head at time k, v(k) represents the measured velocity of the head at time k, a(k) represents an acceleration of the head at time k, and s represents a slope of the phase plane function for computing the deceleration distance such as shown in FIG. 4A.

In one embodiment, the control circuitry shown in FIG. 6 generates the actuator control signal u(k) 40A at the beginning of the acceleration phase based on:

$$u(k)=\min\{u\_coast(k), u\_slewup\} \quad \text{Eq.(4)}$$

where u_coast(k) is the actuator control generated based on the above Eq.(2) and u_slewup is computed as k·C where C is a constant. At the beginning of the seek, the first term in the above Eq.(4) is very large such that the actuator control signal u(k) 40A is generated as the slew up constant u_slewup.

In the example embodiment of FIG. 3, the measured velocity v(k) of the head eventually converges to the updated coast velocity $\bar{v}(k)$ wherein the recursive update of the coast velocity $\bar{v}(k)$ terminates and the coast phase of the seek profile is executed using the final value of the updated coast velocity $\bar{v}(k)$. In one embodiment, the recursive update of the coast velocity $\bar{v}(k)$ may terminate when the actuator control signal generated based on the above Eq.(2) falls below a threshold. In another embodiment, the measured velocity v(k) of the head may not converge to the updated coast velocity $\bar{v}(k)$ in which case the right shaded area shown in FIG. 3 representing the update of the coast velocity $\bar{v}(k)$ may extend left all the way to the deceleration phase (left shaded area). In this embodiment, the actuator control signal u(k) 40A is eventually generated based on the first term in the above Eq.(2).

Figure 7:
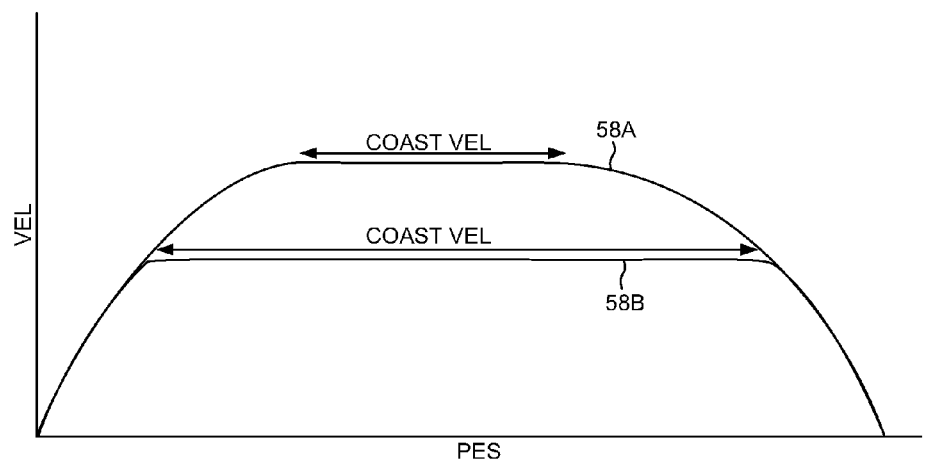
FIG. 7 shows an embodiment wherein the seek profile and corresponding coast velocity may vary relative to different operating seek time profiles such as shown in FIG. 2C.

FIG. 7 illustrates two different seek profiles generated during a seek operation according to an embodiment for seeking by a target seek length based on two different seek times each corresponding to a different operating seek time profile (e.g., as shown in FIG. 2C). For example, the seek profile 58A may correspond to a seek time T generated by the operating seek time profile (A) in FIG. 2C, and the seek profile 58B may correspond to a seek time T generated by the operating seek time profile (B) in FIG. 2C. Because the seek time T generated based on the operating seek time profile (A) is shorter than that generated by operating seek time profile (B), the seek profile 58A in FIG. 7 comprises a higher coast velocity and a shorter coast time as compared to the seek profile 58B.

In one embodiment, configuring the seek profile on-the-fly based on a target seek time T during a seek operation facilitates the ability to generate any arbitrary operating seek time profile based on a base seek time profile such as shown in FIG. 2C. In this manner, the operating seek time profile may be configured and/or adjusted to achieve any desired performance metric without needing to store a number of different operating seek time profiles and/or corresponding seek profiles.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of tracks;
a head actuated over the disk; and
control circuitry configured to:
generate an operating seek time profile as a function of a base seek time profile, wherein the seek time profiles define a seek time to seek the head radially over the disk by a seek length; and
execute a seek operation to seek the head by a target seek length by at least:
generating a target seek time based on the target seek length and the operating seek time profile; and
seeking the head the target seek length based on the target seek time.

2. The data storage device as recited in claim 1, wherein the function comprises an offset added to each seek time in the base seek time profile.

3. The data storage device as recited in claim 1, wherein the function comprises a scalar for scaling each seek time in the base seek time profile.

4. The data storage device as recited in claim 1, wherein the function comprises a complex function based on the seek lengths and corresponding seek times in the base seek time profile.

5. The data storage device as recited in claim 1, wherein the control circuitry is further configured to adjust the operating seek time profile as a function of a runtime parameter.

6. The data storage device as recited in claim 5, wherein the runtime parameter comprises a workload of the data storage device.

7. The data storage device as recited in claim 1, wherein the control circuitry is further configured to execute the seek operation by:
- measuring a velocity of the head over the disk during the seek operation;
- generating a coast velocity based on the measured velocity of the head; and
- adjusting a control signal applied to the actuator based on the measured velocity and the coast velocity.

8. A method of operating a data storage device, the method comprising:
- generating an operating seek time profile as a function of a base seek time profile, wherein the seek time profiles define a seek time to seek a head radially over a disk by a seek length; and
- executing a seek operation to seek the head by a target seek length by at least:
  - generating a target seek time based on the target seek length and the operating seek time profile; and
  - seeking the head the target seek length based on the target seek time.

9. The method as recited in claim 8, wherein the function comprises an offset added to each seek time in the base seek time profile.

10. The method as recited in claim 8, wherein the function comprises a scalar for scaling each seek time in the base seek time profile.

11. The data storage device as recited in claim 8, wherein the function comprises a complex function based on the seek lengths and corresponding seek times in the base seek time profile.

12. The method as recited in claim 8, further comprising adjusting the operating seek time profile as a function of a runtime parameter.

13. The method as recited in claim 12, wherein the runtime parameter comprises a workload of the data storage device.

14. The method as recited in claim 8, further comprising executing the seek operation by:
- measuring a velocity of the head over the disk during the seek operation;
- generating a coast velocity based on the measured velocity of the head; and
- adjusting a control signal applied to the actuator based on the measured velocity and the coast velocity.

\* \* \* \* \*